United States Patent
Bach et al.

(10) Patent No.: US 7,173,535 B2
(45) Date of Patent: Feb. 6, 2007

(54) APPARATUS AND SYSTEM FOR CONTAINING AN ANIMAL

(76) Inventors: Eric D. Bach, 1009 Hampstead Rd., Wynnewood, PA (US) 19096; Steven E. Bach, 1009 Hampstead Rd., Wynnewood, PA (US) 19096

( * ) Notice: Subject to any disclaimer, the term of this patent is extended or adjusted under 35 U.S.C. 154(b) by 25 days.

(21) Appl. No.: 10/271,022

(22) Filed: Oct. 15, 2002

(65) Prior Publication Data
US 2004/0070508 A1    Apr. 15, 2004

(51) Int. Cl.
*G08B 23/00* (2006.01)
(52) U.S. Cl. .............................. 340/573.3; 340/573.2; 119/712
(58) Field of Classification Search ............ 340/573.3, 340/573.1, 573.2, 573.4, 692, 539.1, 539.15, 340/825.49, 943; 119/712; 367/93, 94
See application file for complete search history.

(56) References Cited

U.S. PATENT DOCUMENTS

| | | | | |
|---|---|---|---|---|
| 4,745,882 A | * | 5/1988 | Yarnall et al. | 119/721 |
| 5,353,744 A | * | 10/1994 | Custer | 119/719 |
| 5,381,129 A | * | 1/1995 | Boardman | 340/573.3 |
| 5,460,124 A | * | 10/1995 | Grimsley et al. | 119/721 |
| 5,844,489 A | * | 12/1998 | Yarnall et al. | 340/573.3 |
| 5,949,350 A | * | 9/1999 | Girard et al. | 340/825.49 |
| 6,151,276 A | * | 11/2000 | Peinetti | 367/139 |
| 6,163,261 A | * | 12/2000 | Westrick | 340/573.3 |
| 6,230,661 B1 | * | 5/2001 | Yarnall et al. | 119/721 |
| 6,271,757 B1 | * | 8/2001 | Touchton et al. | 340/573.1 |
| 6,657,544 B2 | * | 12/2003 | Barry et al. | 340/573.3 |
| 2003/0122678 A1 | * | 7/2003 | Duncan et al. | 340/573.3 |

* cited by examiner

*Primary Examiner*—Phung T. Nguyen
(74) *Attorney, Agent, or Firm*—Steven E. Bach

(57) ABSTRACT

An apparatus is provided for containing an animal in a defined area. The apparatus comprises first and second communicating units; one operatively associated with the animal, and the other positioned to locate the area. At least one of the units is adapted to transmit a signal, and at least one of the units is adapted to receive the signal. A circuit is adapted to measure the transmission time or change in transmission time of the signal and calculate the distance between the first and second units. At least one of the first and second units is configured to emit an output to contain the animal in the area when the transmission time corresponds to the animal leaving the area.

11 Claims, 5 Drawing Sheets

APPARATUS AND SYSTEM FOR CONTAINING AN ANIMAL

BACKGROUND OF THE INVENTION

It is often desirable to contain an animal within a particular area for one or more reasons, including but not limited to: protection of the animal, protection of people and other animals from the animal, convenience. Various systems have been devised for containing animal. Fences are expensive, require ongoing maintenance, and are permanent. Also, fences may not be appropriate for all terrain and may not be aesthetically pleasing. A buried line that interacts with an animal collar to shock the animal if it crosses the line addresses the aesthetic problem of fences. Such systems, however, are expensive and permanent. A chain anchored at one end and attached to the animal at the other is inexpensive and may be portable by using a stake or the like for an anchor. Chains, however, may easily become tangled in obstructions, and may be inconvenient or dangerous to people walking or playing in the vicinity of the animal.

SUMMARY OF THE INVENTION

The present invention provides an apparatus for containing an animal in a defined area. The apparatus comprises first and second communicating units. One of the units is operatively associated with the animal and the other unit is positioned to locate the area. At least one of the units is adapted to transmit a signal, and at least one of the units is adapted to receive the signal. At least one of the units comprises a circuit adapted to measure the transmission time of the signal or the change in transmission time of the signal and calculate the distance between the first and second units from the transmission time or change in transmission time. At least one of the first and second units is configured to emit an output to contain the animal in the area when the transmission time or change in transmission time exceeds a set time corresponding to the animal leaving the area.

These and other features and objects of the invention will be more fully understood from the following detailed description of the preferred embodiments, which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings.

DETAILED DESCRIPTION

Figure 1:
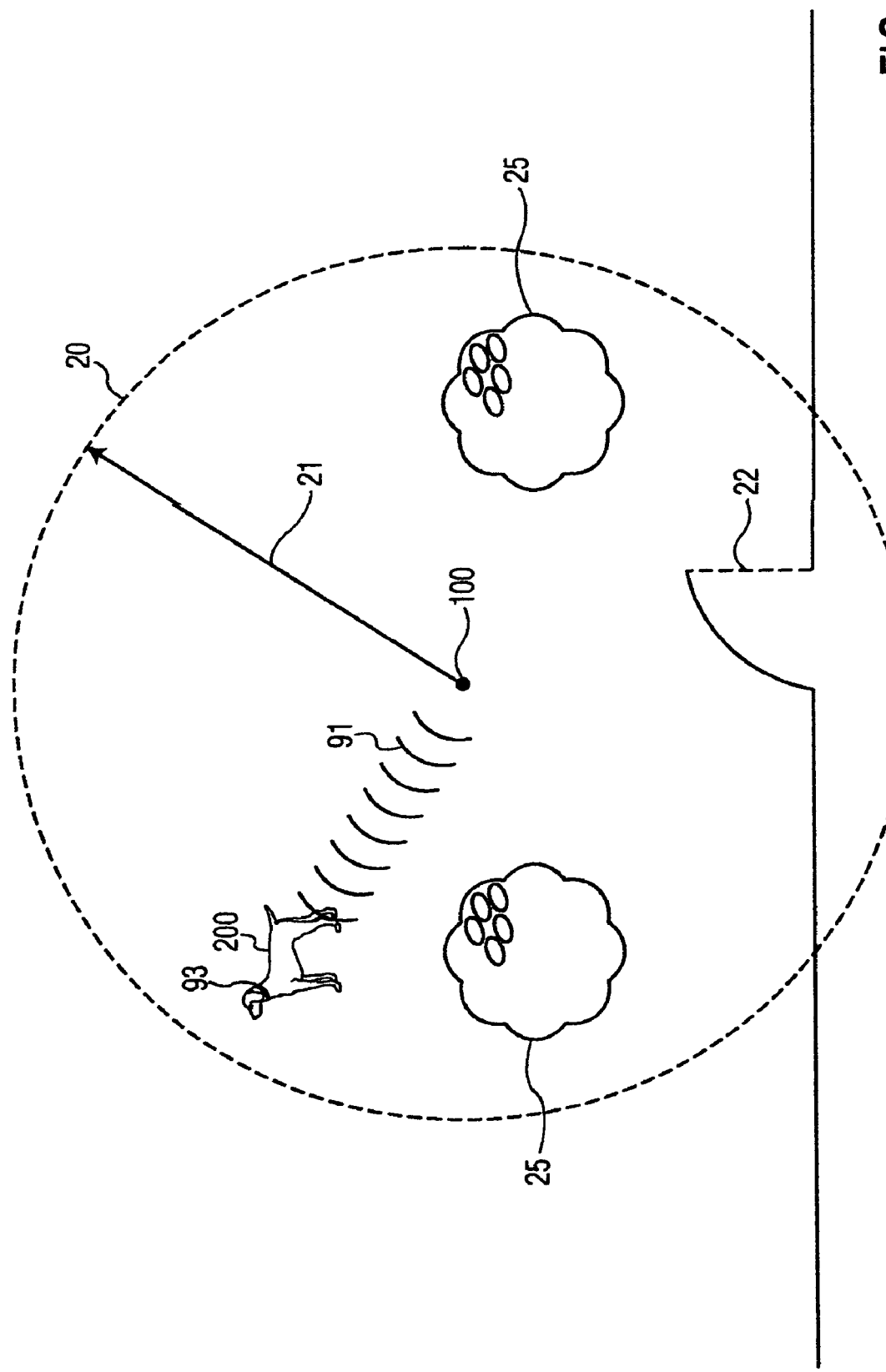
FIG. 1 shows an animal contained in an area by an apparatus according to an exemplary embodiment of the present invention.

In describing the invention illustrated in the drawing, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawing, in general, and FIGS. 1–4 in particular, an apparatus and system of the present invention are disclosed for containing an animal within a defined area.

A first unit 100 transmits a signal 91 at a predetermined time interval. A second unit 200 receives the signal and measures either the time of transmission or the change in the time of transmission of the signal. In an exemplary embodiment illustrated in FIG. 1, first unit 100 is positioned to locate an area 20 in which an animal 10 is to be contained, and second unit is operatively associated with an animal 10. Area 20 may for example be a circle centered at first unit 100 having a radius 21, as shown in FIG. 1. In the embodiment illustrated in FIG. 1, area 20 encompasses a door 22, which may be a door of a dwelling used for ingress and egress by animal 10. It will be apparent to those skilled in the art that an area may be defined having a geometry other than a circle, but such geometry would require more than one first unit 100.

Figure 2:
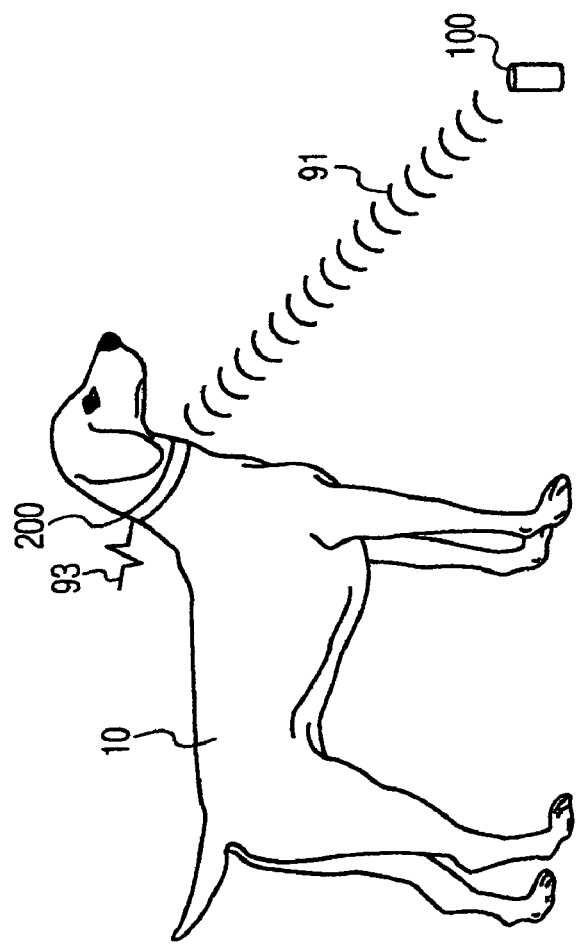
FIG. 2 shows an apparatus according to an exemplary embodiment of the invention having a fixed first unit and a second unit operatively associated with an animal.
Figure 3:
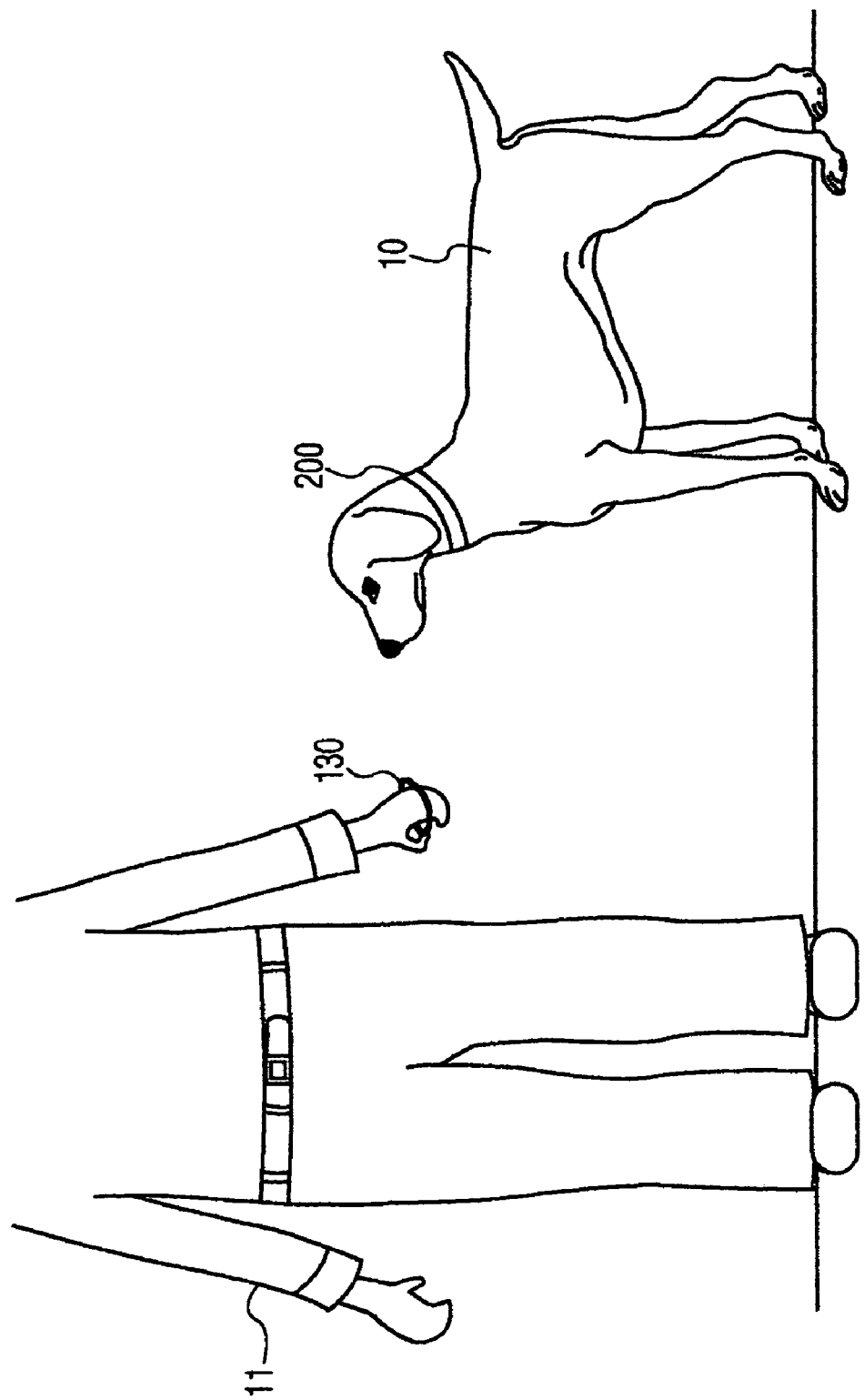
FIG. 3 shows an apparatus according to an exemplary embodiment of the invention having a mobile first unit and a second unit operatively associated with an animal.

As shown in FIG. 2, second unit 200 may be operatively associated with animal 10 by incorporating first unit in a collar placed on the animal, attaching first unit to a collar, or implanting first unit below the skin of the animal 10. First unit 100 may be set in the center of area 20 or fixed in the center of area 20 with a stake or the like. Alternatively, first unit 100 and area 20 may be non-stationary. First unit may, for example, be attached or incorporated into a wristband, hand held device, or the like and worn or held by a person 11, as shown in FIG. 3.

As stated previously, second unit 200 measures either the time taken for signal 91 to propagate from first unit 100 to second unit 200 (i.e., transmission time) or the difference in transmission time compared to a reference time. The measured transmission time is compared to a set time corresponding to a distance equal to radius 21 of area 20. When the measured time of transmission 91 corresponds to a distance equal to radius 21, second unit 200 propagates an output or warning signal 93 to the animal. Warning signal 93 is adapted to urge animal 10 to return to area 20 to stop the warning signal. Exemplary warning signals include a high frequency sound, audible to the animal, but not to people and a mild electric pulse.

As shown in FIG. 1, first unit 100 may be positioned such that door 22 is within area 20. Second unit 200, operatively associated with animal 10 may be provided with a switch for switching second unit 200 between an active and an inactive state. This switch may be triggered, for example, by an action of a person or a proximity switch mounted at door 22. When animal 10 is inside the dwelling, second unit 200 may be switched off so that signal 93 is not propagated.

In an exemplary embodiment, second unit 200 establishes a baseline or reference time when it is switched on, corresponding to radius 21. This reference time is used to determine whether second unit 200, and therefore animal 10 is closer or further from first unit 100 then when second unit 200 was activated.

For example, first unit 100 is positioned 45 feet from door 22. Second unit 200 is activated while animal 10 is 5 feet inside door 22. Signal 91 is propagated at 50 ms intervals. Second unit receives signal 91 at a time, which is set as the baseline or reference time (i.e., 0). If animal 10 remains stationary, the second propagation of signal 91 will be received 50 ms after the first propagation. If animal 10 has moved closer to first unit 100, the second propagation of signal 91 will be received less than 50 ms after the first propagation. Similarly if the animal 10 has moved closer to first unit 100, the third propagation of signal 91 will be received less than 100 ms after the first propagation, and so forth. Conversely, if animal 10 has moved further from first unit 100 the second propagation of signal 91 will be received more than 50 ms after the first propagation, the tenth propagation of signal 91 will be received more than 500 ms after the first propagation, and so forth. When animal 10 moves beyond area 20, as determined by signal 91 being received a preprogrammed time after its corresponding time (a multiple of the propagation interval) warning signal 93 is generated. The preprogrammed time may be, for example 5 ms, so that when signal 91 is received at 100,006 ms after the first propagation, warning signal 93 is generated. If, for example, 5 ms corresponds to 10 feet, area 20 is a circle having radius 21 of 60 feet. Warning signal 93 continues to be generated until animal 10 returns to area 20. While second unit 200 is active, animal 10 may move freely within area 20 without becoming tangles by obstacles 25 and without being encumbered by a chain or the like.

Figure 4:
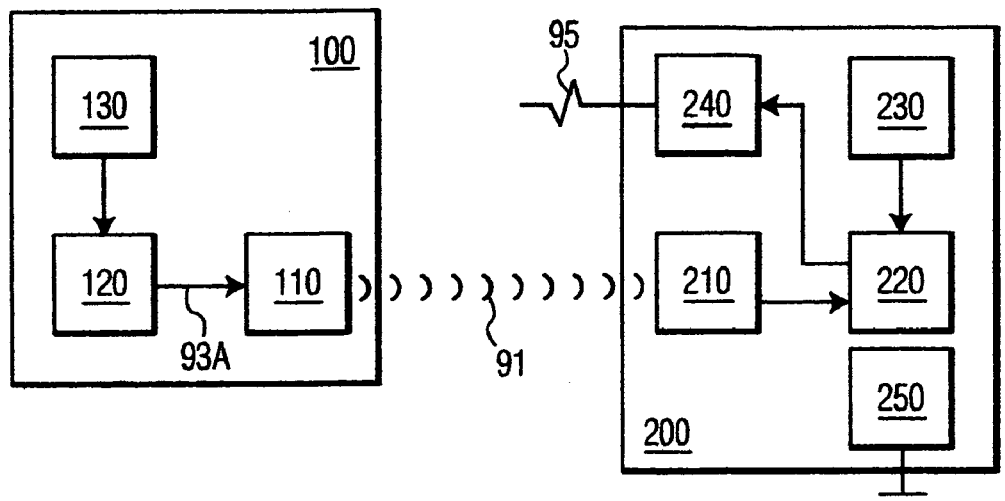
FIG. 4 is a block diagram of an apparatus for containing an animal in a defined area according to an exemplary embodiment of the invention.

Referring now to FIG. 4, first unit 100 comprises a transmitter 110, which transmits signal 91. Transmitter 110 should be understood to be any of a number of components capable of transmitting a signal over operative distances, which can vary from less than 10 feet to over 100 feet, depending upon the area 20 in which animal 10 is to be contained. Transmitter 110 may, for example, be a RF antenna, a broadband transceiver, a microwave transceiver, or any other component capable of transmitting a short, identifiable signal. A signal 93A is generated by a circuit 120 at regular intervals established by clock 130, and sent to transmitter 110. Signal 93 is then propagated from transmitter 110.

Figure 5:
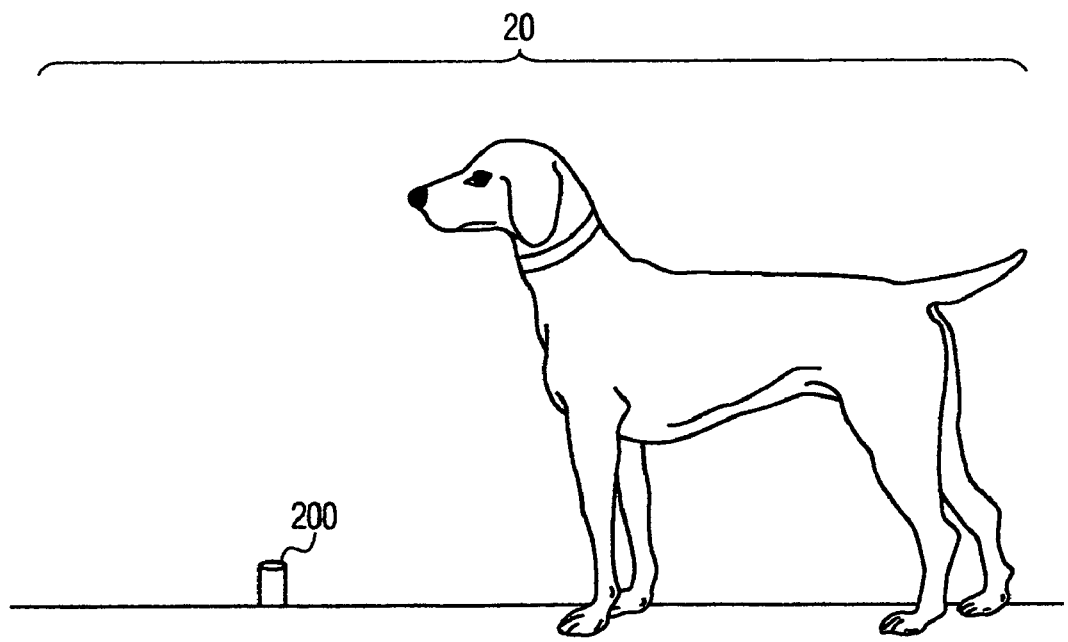
FIG. 5 shows an apparatus according to an exemplary embodiment of the invention having a second unit locating an area and a first unit operatively associated with an animal.
Figure 6:
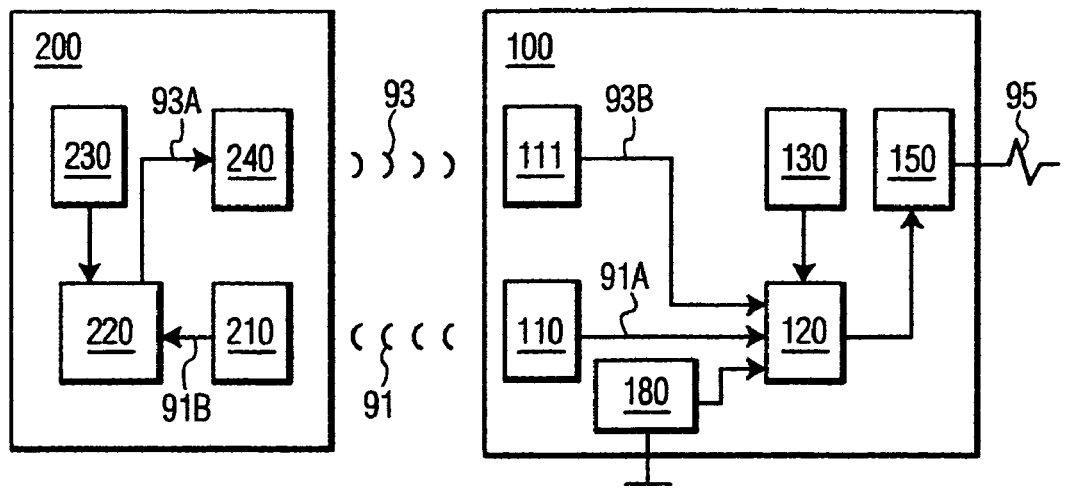
FIG. 6 is a block diagram of an apparatus for containing an animal in a defined area according to an alternative exemplary embodiment of the invention.

In an alternative exemplary embodiment, as shown in FIGS. 5 and 6, first unit 100 is operatively associated with animal 10, and second unit 200 is positioned to locate an area 20. As in the exemplary embodiment described above, a transmitter 110 in first unit 100 transmits a signal 91, and a receiver 210 in second unit 200 receives signal 91. A logic circuit 220 in second unit 200 measures the time of transmission or the change in the time of transmission of signal 91 from first unit 100 to second unit 200, using a clock 230. When animal 10 leaves area 20, second unit 200 transmits a warning signal 93. Warning signal 93 may, for example, be a sound wave at a frequency audible to animal 10. Warning signal 93 may be transmitted from a transmitter 240. If signal 91 and warning signal 93 are compatible, receiver 210 and transmitter 240 may, in fact, be a single transceiver.

A logic circuit 120 in first unit 100 provides a signal 91A to transmitter 110 at a preprogrammed interval using clock 130. This causes transmitter 11 to propagate signal 91 at the programmed interval. Logic circuit 120 may be activated and deactivated using a switch 160.

First unit 100 may include a receiver 111, which receives warning signal 93 and transmits a signal 93B to control circuit 120. If warning signal 83 continues for a set period of time, logic circuit activates an output device 150, which generates an output 95 causing animal to return to area 320. Output device 150 may, for example, be an electrode that generates a mild shock.

In an exemplary embodiment, clocks 130 and 230 are synchronized. Logic circuit 120 causes transmitter 110 to generate signal 91 at a pre-determined interval, for example each tenth of a second. The time of transmission for signal 91 is measured by dividing the difference between the time at which signal 91 is received and the time it was transmitted (i.e., 0.010 seconds, 0.020 seconds, 0.030 seconds . . . ) by the rate of propagation or for the particular form of signal.

Figure 7:
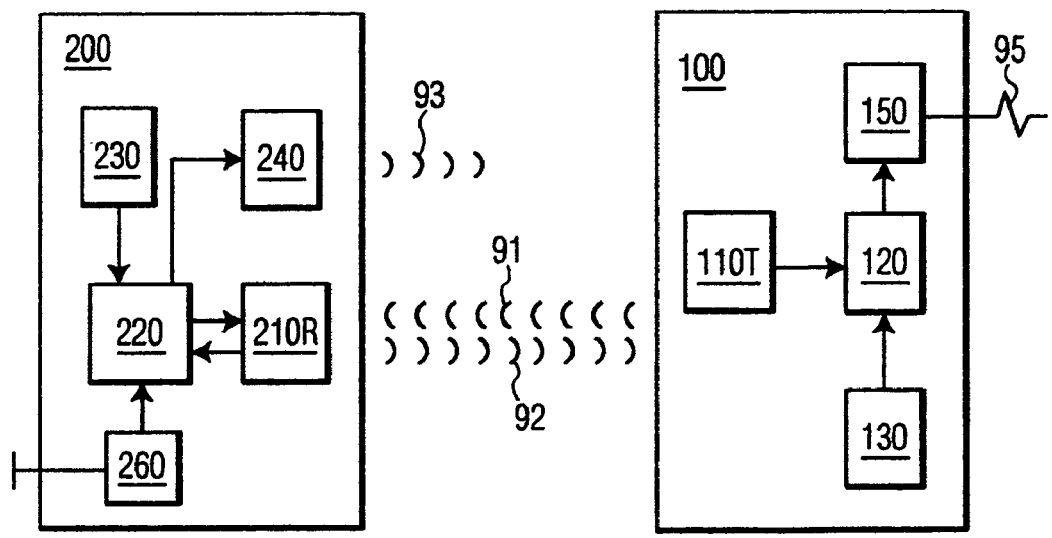
FIG. 7 is a block diagram of an apparatus for containing an animal in a defined area according to another alternative exemplary embodiment of the invention.

Referring now to FIG. 7, in another alternative exemplary embodiment, first unit 100 is operatively associated with animal 10, and second unit 200 is positioned to locate an area 20. As in the exemplary embodiment described above, a transceiver 110T in first unit 100 transmits a signal 91, and a repeater 210R in second unit 200 receives signal 91 and repeats it as signal 92. Transceiver 110T receives signal 92 and forwards it to a logic circuit 120 in first unit 100. Logic circuit 120 measures the time of transmission of signals 91 and 92, using a clock 230. When animal 10 leaves area 20, as determined by a time of transmission corresponding to radius 21 of area 20, an output device 150 of first unit 100 transmits a warning output 95. Warning output 95 may, for example, be an electric pulse. Repeater 210R may also forward signal 91 to an optional logic circuit 220 in second unit 200. Logic circuit 220 may measure the time of transmission for signal 91. Then, when the time of transmission of signal 91 corresponds to a distance slightly less than radius 21 of area 20, logic circuit transmits a signal to output device 240, causing it to transmit a warning signal 93. Warning signal 93 may be, for example, a sound wave audible to animal 10. In FIG. 7, second unit 200 is equipped with a switch 260 to activate and deactivate the system. It should be understood, however, that first unit 100 may be equipped with a switch instead of or in addition to second unit 200.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. An apparatus for containing an animal within a defined area, said apparatus comprising:
    a first unit having a transmitter transmitting an ultrasonic signal at a predetermined time interval;
    a second unit having a receiver receiving said signal and a timing circuit measuring a time of transmission for said ultrasonic signal from the predetermined time of transmission to the time that said signal is received;
    one of said first and second units being adapted to be operatively associated with said animal and the other of said first and second units being adapted to be positioned to locate said area; and
    at least one of said first and second units producing an output for containing said animal when said time of transmission corresponds to said animal being outside of said area.

2. The apparatus of claim 1 wherein said output is an electric pulse.

3. The apparatus of claim 1 wherein said output is a sound wave audible to said animal.

4. The apparatus of claim 1 wherein said first unit locates said area and said second unit is operatively associated with said animal.

5. The apparatus of claim 1 wherein said first unit is transportable.

6. The apparatus of claim 5 wherein said one of said first unit is adapted to be carried or worn by a person.

7. An apparatus for containing an animal in a defined area, the apparatus comprising first and second communicating units:
   at least one of said units being adapted to transmit a signal, and at least one of said units being adapted to receive said signal;
   at least one of said units being operatively associated with said animal and the other of said units being positioned to locate said area;
   at least one of said units comprising a circuit adapted to determine the transmission time of said signal and calculate the distance between said first and second units from said transmission time;
   at least one of said first and second units configured to emit an output to contain said animal in said area; and
   at least one of said first and second units having a switch for activating and deactivating said unit.

8. The apparatus of claim 7 wherein said switch is disposed on said unit being adapted to transmit a signal.

9. The apparatus of claim 7 wherein said switch is a proximity switch.

10. The apparatus of claim 9 wherein said switch is adapted to be activated with said animal at an entrance to said area.

11. The apparatus of claim 7 wherein said unit having a switch is adapted to be activated at a predetermined distance from said second unit, establishing a timing baseline.

* * * * *